July 7, 1964   A. E. BURCH   3,140,017
PRECISION APPLICATOR
Filed March 26, 1962   2 Sheets-Sheet 1

INVENTOR.
ARCHIE E. BURCH
BY Alexander Riaboff
ATTORNEY

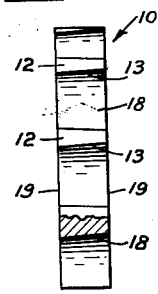
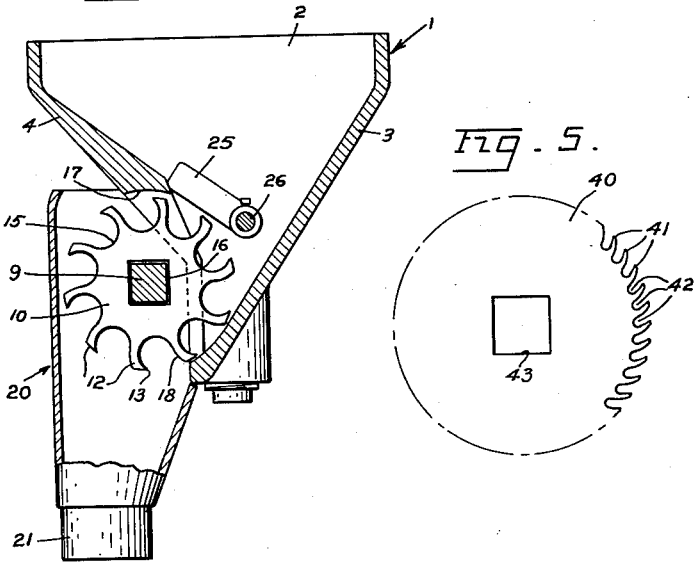
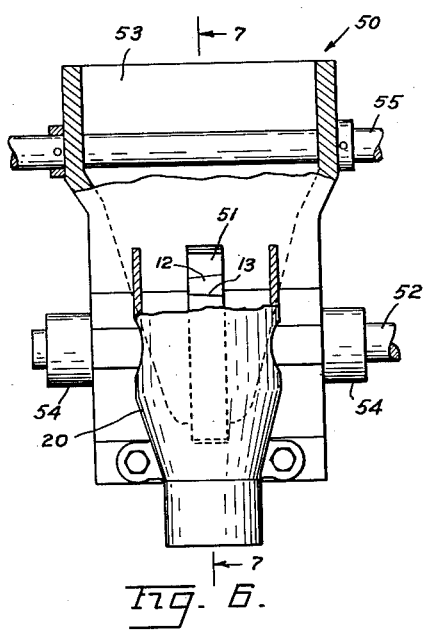
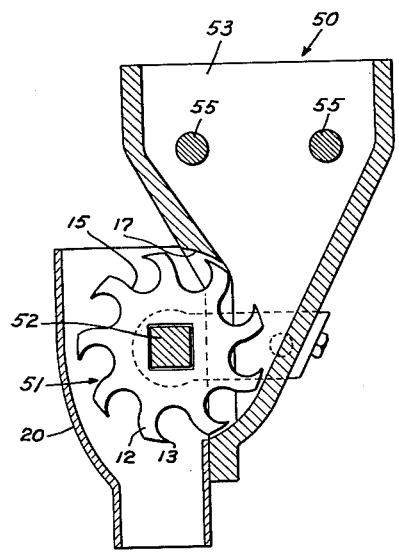

United States Patent Office 3,140,017
Patented July 7, 1964

3,140,017
PRECISION APPLICATOR
Archie E. Burch, P.O. Box 595, Williams, Calif.
Filed Mar. 26, 1962, Ser. No. 182,332
13 Claims. (Cl. 222—197)

This invention relates to a precision applicator and more particularly to a device for depositing insecticides, chemicals and fertilizer on plants and on the ground.

The object of this invention is to provide a device for depositing a predeterminate amount of a chemical such as insecticide, fertilizer, or the like, on or between plants growing in fields.

Another object of this invention is to provide a device of the type described in which the chemical carried by the device is forcibly scooped in measured amounts, carried out through a slot in the wall of said device and dropped on a plant or the ground thereunder.

Still another object of this invention, is to provide a distributing element for said device, including claws for scooping the chemical carried by said device and filling pockets formed between the adjoining claws therewith.

Other objects and advantages will appear as the specification proceeds and the novel features of the device will be particularly pointed out in the claims hereto annexed.

In the drawings:

FIG. 3 is a vertical cross-sectional view of the device taken on the line 3—3 of FIG. 2.

FIG. 4 is a front view of the distributing element.

FIG. 5 is a plan view of a modified form of the distributing element.

FIG. 6 is a front view, partly in section, of a modified form of the device, and FIG. 7 is a central, vertical, cross-sectional view of the device taken on the line 7—7 of FIG. 6.

Figure 1:
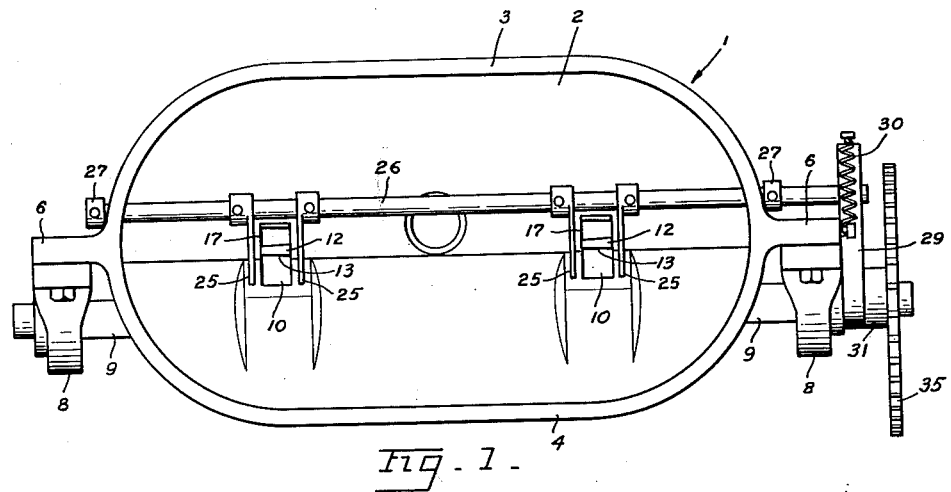
FIG. 1 is a top plan view of the device.
Figure 2:
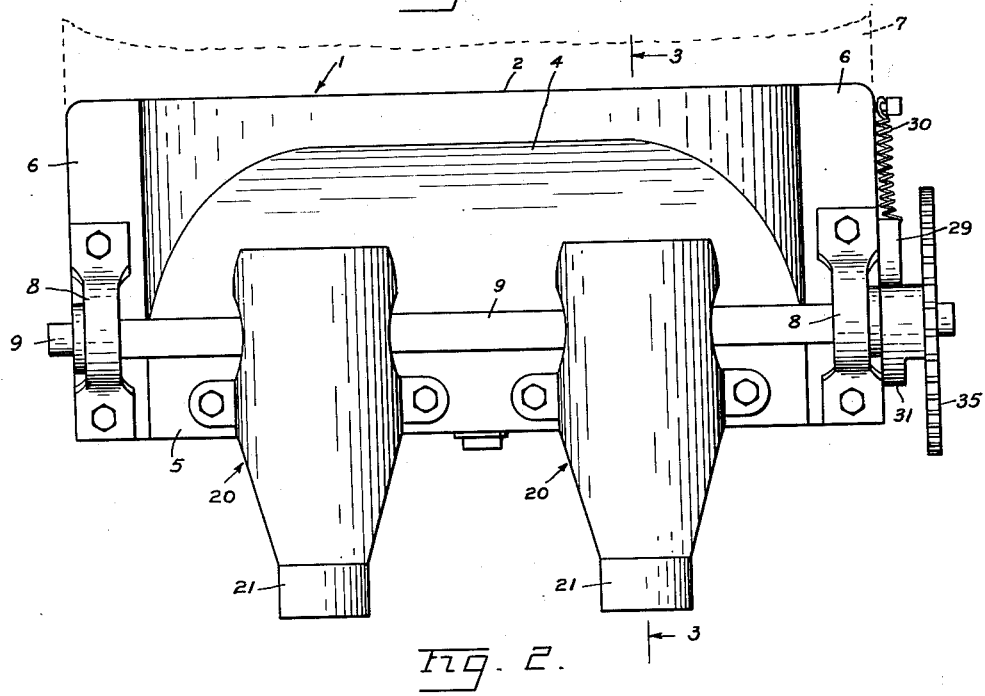
FIG. 2 is a front elevational view of the device.

The precision applicator 1, shown in FIGURES 1–3, includes a container 2. The latter is shown as oval in the plan view, but may be of any other suitable configuration. Its back wall 3 is slanted forwardly at an angle, and its front wall 4 is slanted backwardly except the lower portion 5 which is vertical. The container 2 is provided with a pair of opposite vertical ears 6 by means of which it may be secured to an open bottom of a hopper 7, which is carried by a tractor. This arrangement permits a chemical, or fertilizer, to drop by gravity from the hopper 7 into the container 2 to be distributed therefrom, as hereinafter shall be described in detail.

Each of the ears 6 carries a bearing 8 which rotatably supports a shaft 9 arranged outside of said container for keeping said bearings away from powdered chemicals and fertilizer. The shaft 9 is preferably square in cross-section and slidably carries a pair of spaced distributing elements 10. Each of the latter consists of flat metal disks having a plurality of equally spaced claws 12 arranged on the periphery thereof, each claw being curved in direction of rotation and having a sharp leading edge 13. A rounded pocket 15 is formed between each two adjoining claws 12. The element 10 has a square hole 16 in the center thereof through which the shaft 9 passes.

The element 10, as shown in FIG. 3, enters the container 2 through a slot 17 in the front wall 4 and its lower portion 5, so that the smaller portion of said element is inside said container and the major portion is outside the same. As shown in FIG. 4, the transverse wall 18 forming said pockets and claws is not at a right angle to the sides 19 of the disk, but at an angle so as to increase the mixing of the material in the container by pushing the same, not only upwardly, but sideways as well.

When the elements 10 are rotated by the shaft 9 in a counter clockwise direction, looking at FIG. 3, the claws 12, passing through the material in the container, scoop the same, or, if necessary, cut and crush the same, and fill up the pockets 15. The filled pockets pass through the slot 17 which trims the excess of the material on the sides and the top of said pockets, and the material remaining in said pocket is carried out and discharged on the ground, or on a plant under the element.

A funnel 20 having a narrow discharge end 21 directed downwardly covers the outside part of the element 10.

For handling fine materials of powder type, such as insecticides or the like, a pair of agitators 25 is provided near each distributing element 10, one on each side thereof. The agitator 25 is in the form of a flat blade and is secured to a bar 26, extending the length of the container and journaled in its side walls. Stops 27 on said bar prevent its lateral displacement. The bar 26 is oscillated by a lever 29 secured to one of its ends. A spring 30 connects the rear end of said lever to the ear 6, which spring urges said rear end upwardly. The front end of said lever rides on a cam 31 carried by the shaft 9. The combined action of the spring 30 and of the cam 31 oscillates the bar 26 and swings the agitators through a certain arc.

The shaft 9 also carries a driving gear 35 which is operatively connected to some driving means not shown in the drawing.

The precision applicator operates as follows:

One or more applicators are secured to a hopper carried by a tractor at a proper distance therebetween, depending upon the intended use. The material from the hopper falls by gravity into the container 2. The claws 12 scoop the material and fill the pockets 15. The material in said pockets is trimmed, while the distributing element 10 passes through the slot 17, thus making the content of the pockets uniform.

After the loaded pockets pass outside through said slots 17, the material falls out of said pockets and drops either on the ground, or on small plants under said funnels 20.

The device is preferably operated by a fluid motor which allows a great variety of rotation speeds for the shaft 9, and hence the rate of distribution of the material can be varied accordingly. In addition thereto, the elements 10 of various thicknesses, less than that shown in the drawing, may be used, in which case a filler is used to cover, or fill, the slot 17 partially, so as to provide a passage for the element 10 with a fairly good degree of fitness at the sides of said element. In this manner the size of each individual deposit can also be changed.

The element 10 is specifically designed to enter the container where the material is present and to take the same forcibly by clawing and scooping the material and fill with the same pockets 15. This feature is of paramount importance for the reason that many chemicals which are used as fertilizers, are in the form of chunks of various sizes; the others might have been pulverized, but in damp weather, became caked. Therefore, means should be provided for crushing and tearing apart the material and for forcing it into the pockets 15. Without this forcible action the operation of the device would be unreliable, and the discharge of the material would vary with the peculiar characteristics of a particular chemical and with the weather. The present machine distributes the same amount of material whether it is dry and powdered, or wet and caked.

FIG. 3 shows that the square hole 16 is made slightly, about one sixteenth of an inch, larger than the cross-section of the shaft 9 passing therethrough. This arrangement permits the element 10 to vibrate slightly during its rotation and to shake off powdered chemicals, such as triple phosphate, which settle on the sides 19 of the element 10, and does not permit said chemicals to stick to and accumulate on said sides and to jam said element in slot 17. The element 10, tightly arranged on the shaft 9, does not vibrate and, in distributing said chemicals, becomes jammed in the slot 17 in less than three hours. The element 10 provided with large pockets 15, which minimize the area of the sides 19 and thus help to reduce the amount of the powdered chemicals thereon.

FIG. 5 shows a distributing element 40 which is formed with a plurality of peripheral sharp teeth 41 forming comparatively shallow pockets 42 therebetween and having a central square opening 43 in the middle for the shaft 9. The element 40 is used for distributing insecticides in comparatively small amounts on small plants.

FIGS. 6 and 7 shows a small precision applicator 50 having one distributing element 51 which is of the same construction and operates in substantially the same way as the above described element 10.

The shaft 52 carrying the element 51 is arranged outside the container 53 and rotates in bearings 54 secured to the sides of said container.

The applicators 50 are carried by a pair of parallel tool bars 55 carried by tractors as standard equipment.

The applicators 50 are spaced a desired distance from each other so as to be exactly over the rows of plants for the purpose of depositing an insecticide powdered chemical thereon.

The shafts 52 are rotated preferably by a fluid motor permitting a variety of speeds of rotation of said shafts.

Having thus described this invention, I claim:

1. A precision applicator comprising
   a hopper;
   a shaft arranged outside of said hopper;
   bearings carried by said hopper for rotatably supporting said shaft;
   a distributing element arranged on said shaft for rotation therewith;
   said hopper having a slot in the wall thereof for admitting a part of said element into the hopper;
   a plurality of claws circumferentially and equidistantly arranged on said element;
   said element having a pocket arranged between each two adjoining claws;
   each of said claws having a sharp leading edge for cutting and scooping the material in the hopper and forcing the same into the pockets to be carried in said pockets out of said hopper and discharged on the ground; said slot being of the size to fit the element closely for trimming the excess of material carried by said pockets and extending beyond the same; and means for rotating said shaft 2. A device as described in claim 1, including an agitator for agitating the material in hopper and means for operating the same.

3. A device as described in claim 1, including means for vibrating said element on said shaft for shaking off the material from the element to prevent the jamming of the same in the slot.

4. A precision applicator of the class described comprising a hopper for holding the material to be distributed over the ground;
   a material distributing element rotatably arranged outside said hopper, said element consisting of a disk having a plurality of claws formed on its periphery equidistantly for cutting and scooping the material in the hopper, said claws being separated by pockets formed between adjoining claws for holding the material scooped by said claws;
   said hopper having a slot in a side wall of the same for admitting, partially the element into the hopper for cutting said material and scooping the same into the pockets and carrying it outside said hopper through said slot; said slot closely fitting said disk on its sides, top and bottom for trimming the excess of the material carried by said pockets; said hopper walls being so arranged that the pockets closest to the entrance and exit of said disk are closed thereby to prevent the seepage of the material when the disk stops rotating.

5. A precision applicator for distributing powdered material comprising:
   a hopper for carrying said powdered material;
   a material distributing element arranged on a shaft for rotation therewith outside of said hopper, said element having a plurality of claws on the periphery thereof separated by pockets;
   said hopper having a slot in the wall thereof through which said element partially enters the hopper for scooping said material, carrying it through the slot outside said hopper, whereby the load of each pocket is trimmed by the walls of said slot; and means on said element and said shaft for vibrating said element for shaking off the powdered material adhering to the sides of the element.

6. A precision applicator for distributing powdered material comprising:
   a hopper for carrying said powdered material;
   a shaft angular in cross-section, arranged outside of said hopper;
   a material distributing element carried by said shaft for rotation therewith, said element having a plurality of claws equidistantly formed on the periphery thereof, said claws being separated by pockets provided in the body of the element;
   said hopper having a slot in its wall through which said element is partially admitted into the hopper for scooping said material by said claws in its pockets and carrying it through said slot out of said hopper whereby each pocket load is trimmed by the walls of said slot;
   said element having an angular hole in its center of slightly larger dimensions than those of the shaft for vibrating the element for shaking off the powdered material adhering to the sides thereof.

7. A precision applicator for distributing insecticides, chemicals, or fertilizers in measured amounts, on plants and on the ground, comprising:
   a hopper for storing the material to be distributed;
   a shaft angular in cross-section arranged for rotation outside said hopper;
   a material distributing element in the form of a disk having a plurality of claws circumferentially and equadistantly arranged on said disk and forming a pocket between each pair of adjoining claws; said disk having an angular hole in the center thereof through which said shaft passes, said hole being of such dimensions as to admit said shaft loosely and to permit said disk to vibrate on said shaft during the rotation thereof for shaking off the powdered material adhering to the sides of the disk;
   said hopper having a slot through which said disk enters the hopper for filling its pockets with the material, carrying it out of the hopper and discharging said material out of said pockets downwardly, said slot being of the size to fit closely said disk on its sides, top and bottom for trimming the excess of the material carried by said pockets and extending beyond the same;
   the walls of said hopper being so formed as to close the pockets which are in the slot near its exit and the entrance to prevent the leakage of the material from the hopper when the rotation of the disk stops.

8. In a fertilizer precision applicator including a hopper for carrying fertilizer material for distribution on the ground and having a slot in the wall thereof;
   a fertilizer distributing element in the form of a disc, arranged for rotation through said slot for carrying metered amounts of fertilizer out of said hopper and depositing the same on the ground;

said disc having a plurality of claws on the periphery thereof, separated by pockets, for cutting said material and filling the pockets therewith, the transverse wall of said disc forming said claws and pockets being at an oblique angle to the side surfaces of said disc for agitating said material by pushing it away from said disc, when the latter passes through said material.

9. In a fertilizer precision applicator, including a hopper for carrying fertilizer material, and having a slot in the wall thereof;
- a material distributing element in the form of a disc arranged on said hopper for rotation in said slot and partially in said hopper for carrying metered amounts of fertilizer out of the hopper and depositing the same on the ground;
- said disc having a plurality of claws formed on the periphery thereof, separated by pockets, said claws being adapted to cut and claw into said fertilizer material and to scoop it into said pockets;
- the transverse wall of said disc forming said claws and pockets being at an oblique angle to the sides of said element for pushing said material sideways;
- said disc being adapted to trim off the excess of fertilizer material in the pockets while the pockets pass through the slot.

10. A precision applicator for distributing bulk material over a surface, comprising:
- a hopper for carrying material, including two downwardly converging walls forming an apex at the bottom of the hopper;
- a shaft secured outside of the hopper and parallel to one of the above mentioned walls;
- a material distributing element in the form of a disc carried by said shaft for rotation therewith and arranged for vibration thereon;
- a plurality of claws formed equadistantly on the periphery of said disc, separated by pockets in the body thereof;
- said last mentioned wall having a vertical lateral slot therein through which a portion of the disc projects into the apex of the hopper for scooping material by its claws into the pockets and carrying it through said slot out of said hopper, the disc portion in the hopper rotating in the direction from the bottom upwardly, through the slot and outside the hopper, each pocket load being trimmed by the walls forming the slot when the load passes through the slot.

11. The precision applicator as described in claim 10, in which the shaft is angular in cross-section and the disc has an angular hole in its center, the configuration of which is similar to said cross-section, but of slightly bigger dimensions for vibrating the disc on said shaft for disposing of the material adhering to the sides thereof.

12. The precision applicator as described in claim 10, in which the side wall forming the pockets and the claws in the disc is at an oblique angle to the side surface of said disc for agitating fertilizer in the hopper.

13. The precision applicator as described in claim 11, in which the side wall forming the pockets and the claws in the disc is frusto-conical in form for agitating fertilizer in the hopper.

References Cited in the file of this patent
UNITED STATES PATENTS

| | | |
|---|---|---|
| Re. 1,166 | Smith | Apr. 2, 1861 |
| 297,488 | Becker | Apr. 22, 1884 |
| 374,539 | Jones | Dec. 6, 1887 |
| 2,457,900 | Hyland | Jan. 4, 1949 |

FOREIGN PATENTS

| | | |
|---|---|---|
| 254,520 | Germany | Dec. 9, 1912 |
| 408,539 | Canada | Nov. 10, 1942 |
| 448,567 | Canada | May 18, 1948 |